(12) United States Patent
Costa et al.

(10) Patent No.: US 11,689,426 B2
(45) Date of Patent: Jun. 27, 2023

(54) SYSTEM AND METHOD FOR APPLYING CMTS MANAGEMENT POLICIES BASED ON INDIVIDUAL DEVICES

(71) Applicant: OpenVault, LLC, Hoboken, NJ (US)

(72) Inventors: Tony Costa, Green Brook, NJ (US); Mark Trudeau, Hoboken, NJ (US)

(73) Assignee: OPENVAULT, LLC, Hoboken, NJ (US)

( * ) Notice: Subject to any disclaimer, the term of this patent is extended or adjusted under 35 U.S.C. 154(b) by 0 days.

(21) Appl. No.: 17/003,514

(22) Filed: Aug. 26, 2020

(65) Prior Publication Data

US 2021/0067414 A1 Mar. 4, 2021

Related U.S. Application Data

(60) Provisional application No. 62/892,239, filed on Aug. 27, 2019.

(51) Int. Cl.
| | | |
|---|---|---|
| *H04L 41/0893* | (2022.01) | |
| *H04L 12/28* | (2006.01) | |
| *H04L 41/0896* | (2022.01) | |
| *H04N 21/61* | (2011.01) | |
| *H04L 41/0894* | (2022.01) | |
| *H04L 41/046* | (2022.01) | |
| *H04L 43/16* | (2022.01) | |
| *H04L 43/0876* | (2022.01) | |

(52) U.S. Cl.
CPC ...... *H04L 41/0893* (2013.01); *H04L 12/2801* (2013.01); *H04L 41/0894* (2022.05); *H04L 41/0896* (2013.01); *H04L 43/0876* (2013.01); *H04N 21/6118* (2013.01)

(58) Field of Classification Search
CPC .......... H04L 41/0893; H04L 41/0896; H04L 12/2801; H04L 12/2854; H04L 41/046; H04L 43/0876; H04N 21/6118
See application file for complete search history.

(56) References Cited

U.S. PATENT DOCUMENTS 6,385,773 B1 * 5/2002 Schwartzman ..... H04L 12/2801
725/124
8,015,271 B2 * 9/2011 McKeown .............. H04L 41/00
709/226

(Continued)

*Primary Examiner* — Asghar H Bilgrami
(74) *Attorney, Agent, or Firm* — Foley & Lardner LLP

(57) ABSTRACT

At least one aspect is directed to managing policies to control network assets in real-time by dynamically enforcing policies based on a variety of detected conditions including service quality, subscriber usage, network performance, bandwidth, and events. The systems and methods described herein can enforce policy actions using the PacketCable Multimedia (PCMM) protocol, which is supported by Cable Modem Termination Systems (CMTS). The present solution can monitor IPDR usage data and SNMP network utilization data to determine conditions about the network and provide PCMM instructions to a CMTS to control network resources on an individual subscriber level. By providing PCMM instructions to a CMTS, the present solution can make service changes to individual modems without modifying the modem's configuration file, requiring a modem reboot, or the installation of additional hardware in the operator's network.

20 Claims, 7 Drawing Sheets

(56) References Cited

U.S. PATENT DOCUMENTS

| | | | |
|---|---|---|---|
| 8,619,630 B2* | 12/2013 | Riley | H04L 47/822 370/255 |
| 2003/0202534 A1* | 10/2003 | Cloonan | H04N 7/22 370/468 |
| 2008/0005156 A1* | 1/2008 | Edwards | H04L 45/22 707/999.102 |
| 2008/0049632 A1* | 2/2008 | Ray | H04L 43/0852 370/250 |
| 2010/0061235 A1* | 3/2010 | Pai | H04L 12/2801 370/230.1 |
| 2010/0103820 A1* | 4/2010 | Fuller | H04L 47/10 370/236 |
| 2010/0169475 A1* | 7/2010 | Woundy | H04L 63/1408 709/224 |
| 2010/0246401 A1* | 9/2010 | Woundy | H04L 12/2861 370/236 |
| 2012/0327816 A1* | 12/2012 | Morrill | H04M 15/43 370/259 |

* cited by examiner

SYSTEM AND METHOD FOR APPLYING CMTS MANAGEMENT POLICIES BASED ON INDIVIDUAL DEVICES

This application claims the benefit of and priority to U.S. Provisional Patent Application No. 62/892,239, filed Aug. 27, 2019, which is incorporated herein by reference in its entirety.

BACKGROUND

Broadband service providers typically use a variety of systems, such as Cable Modem Termination Systems (CMTS) for cable networks or Optical Line Termination (OLT) for fiber networks to deliver high-speed Internet access to their subscribers. Depending on their usage, certain subscribers can create network congestion by unfairly over-utilizing allotted network resources. Network congestion can interrupt the service of other subscribers that use the CMTS or OLT for Internet access.

SUMMARY

At least one aspect of the present disclosure is directed to management and enforcement of networking policies. The subject matter of the present disclosure can enable operators and enterprises to control network assets in real-time by dynamically enforcing policies based on a variety of detected conditions including but not limited to service quality, subscriber usage, network performance, bandwidth, and events. For example, the systems and methods described herein can be configured with rules that would cause the altering of a cable subscriber's service for a period of time if specific pre-defined conditions are detected in a network. The systems and methods described herein can interface with operator network assets, data sources, and enforcement end-points using standards based or proprietary interfaces on any network technology including cable, fiber, mobile, Digital Subscriber Line (DSL), Internet Protocol (IP), and next generation networks.

The present disclosure describes systems and methods for enforcing policy actions that can be triggered when pre-defined policies or business rules based on specific conditions are detected on monitored sources from an operator or third-parties. The systems and methods described herein can enforce policy actions using a variety of methods including the PacketCable Multimedia (PCMM) protocol which is supported by Cable Modem Termination Systems (CMTS). PCMM can allow the dynamic creation and deletion of service flows and can be used, for example, to effectively change a subscriber's service by temporarily overwriting the default service configured for a modem. By utilizing PCMM, these service changes can take without the need for a modification to the modem's configuration file, modem reboot, or the installation of additional hardware in the operator's network.

The systems and methods described herein can also enable operators to generate additional revenue by offering temporary speed boost services, enforcing acceptable usage policies, or controlling usage allowances. The frameworks and processing capabilities of the systems and methods described herein can utilize independent policy agents that can continuously monitor sources for specific conditions that trigger or release policy enforcement actions. The present solution can also provide ease of use by managing all policy agents in an automated environment without requiring additional hardware in the operator's network. Further, the systems and methods described herein do not require integration with the operator systems, for example provisioning. Operators may be able to extend the life of their network and switching technology, allowing them to save money in the near-term.

The systems and methods discussed herein could also allow operators to offer new services for transactional fees. For example, subscribers (e.g., cable modem users) can elect to pay extra fees for bandwidth speed boosts during times of need and based on their usage behavior without committing to a new subscription for a higher monthly fee. In another example, operators could use the solutions discussed herein to enforce usage caps. This could result in a significant migration of subscribers to higher bandwidth plans, potentially driving additional revenues. The present solution can provide a fair share in a shared service environment. In contrast, a blanket all-inclusive policy is a massive violation of fair share and Acceptable Use Policy (AUP) network management policies.

At least one aspect of the present disclosure relates to a method for allocating signal processing resources for cable modem endpoints. The method can be performed by a policy engine having one or more processors and a memory, or any other computing device described herein. The method can include monitoring usage data of a cable network via a cable modem termination system. The method can include detecting from the usage data, a congestion condition on a channel of the cable network. The method can include identifying one or more cable modems of the cable network that contribute to the congestion condition. The method can include determining that the congestion condition satisfies a congestion threshold. The method can include sending instructions to the cable modem termination system that regulates the one or more cable modems that contribute to the detected congestion condition.

In some implementations, monitoring the usage data from the cable network can include receiving the usage data from internet protocol detail records exported by the cable modem termination system. In some implementations, detecting the congestion condition can include determining the bandwidth utilization of media access control addresses associated with modems connected to the cable network. In some implementations, detecting the congestion condition can include determining that the cable network has exceeded a network capacity threshold.

In some implementations, identifying the one or more cable modems can include determining bandwidth utilization information for cable modems of the cable network. In some implementations, the method can include identifying from the bandwidth utilization information, a subset of the cable modems that contribute most to the bandwidth utilization in the cable network as the one or more cable modems. In some implementations, determining that the congestion condition can satisfy the congestion threshold includes determining that a utilization of the cable network exceeds a network capacity threshold.

In some implementations, determining that the congestion condition satisfies the congestion threshold includes determining that one or more MAC domains have exceeded a utilization threshold. In some implementations, identifying the one or more cable modems of the cable network can include determining that a bandwidth management policy is in place for a set of cable modems of the cable network. In some implementations, identifying the one or more cable modems of the cable network can include identifying the one or more cable modems of the cable network other than the set of cable modems that are contributing to the congestion condition.

In some implementations, sending the instructions to the cable modem termination system can include generating PacketCable multimedia instructions for the cable modem termination system that change service parameters for the one or more cable modems. In some implementations, sending the instructions to the cable modem termination system can include providing the PacketCable multimedia instructions to the cable modem termination system. In some implementations, the PacketCable multimedia instructions can be configured to cause the cable modem termination system to throttle the bandwidth of the one or more cable modems.

At least one other aspect of the present disclosure relates to a system for allocating signal processing resources for cable modem endpoints. The system can include a policy engine having one or more processors and a memory. The system can monitor usage data of a cable network via a cable modem termination system. The system can detect, from the usage data, a congestion condition on a channel of the cable network. The system can identify one or more cable modems of the cable network that contribute to the congestion condition. The system can determine that the congestion condition satisfies a congestion threshold. The system can send instructions to the cable modem termination system that regulate the one or more cable modems that contribute to the detected congestion condition.

In some implementations, the system can receive the usage data from interne protocol detail records exported by the cable modem termination system. In some implementations, the system can determine the bandwidth utilization of media access control addresses associated with modems connected to the cable network. In some implementations, the system can determine that the cable network has exceeded a network capacity threshold.

In some implementations, the system can determine bandwidth utilization information for cable modems of the cable network. In some implementations, the system can identify, from the bandwidth utilization information, a subset of the cable modems that contribute most to the bandwidth utilization in the cable network as the one or more cable modems. In some implementations, the system can determine that a utilization of the cable network exceeds a network capacity threshold. In some implementations, determining that the congestion condition can satisfy the congestion threshold includes determining that one or more mac domains have exceeded a utilization threshold.

In some implementations, identifying the one or more cable modems of the cable network can include determining that a bandwidth management policy is in place for a set of cable modems of the cable network. In some implementations, identifying the one or more cable modems of the cable network can include identifying the one or more cable modems of the cable network other than the set of cable modems that are contributing to the congestion condition.

In some implementations, sending the instructions to the cable modem termination system can include generating PacketCable multimedia instructions for the cable modem termination system that change service parameters for the one or more cable modems. In some implementations, sending the instructions to the cable modem termination system can include providing the PacketCable multimedia instructions to the cable modem termination system. In some implementations, the PacketCable multimedia instructions can be configured to cause the cable modem termination system to throttle the bandwidth of the one or more cable modems.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of managing network policies. The various concepts introduced above and discussed in greater detail below may be implemented in any of numerous ways, as the described concepts are not limited to any particular manner of implementation.

Figure 1:
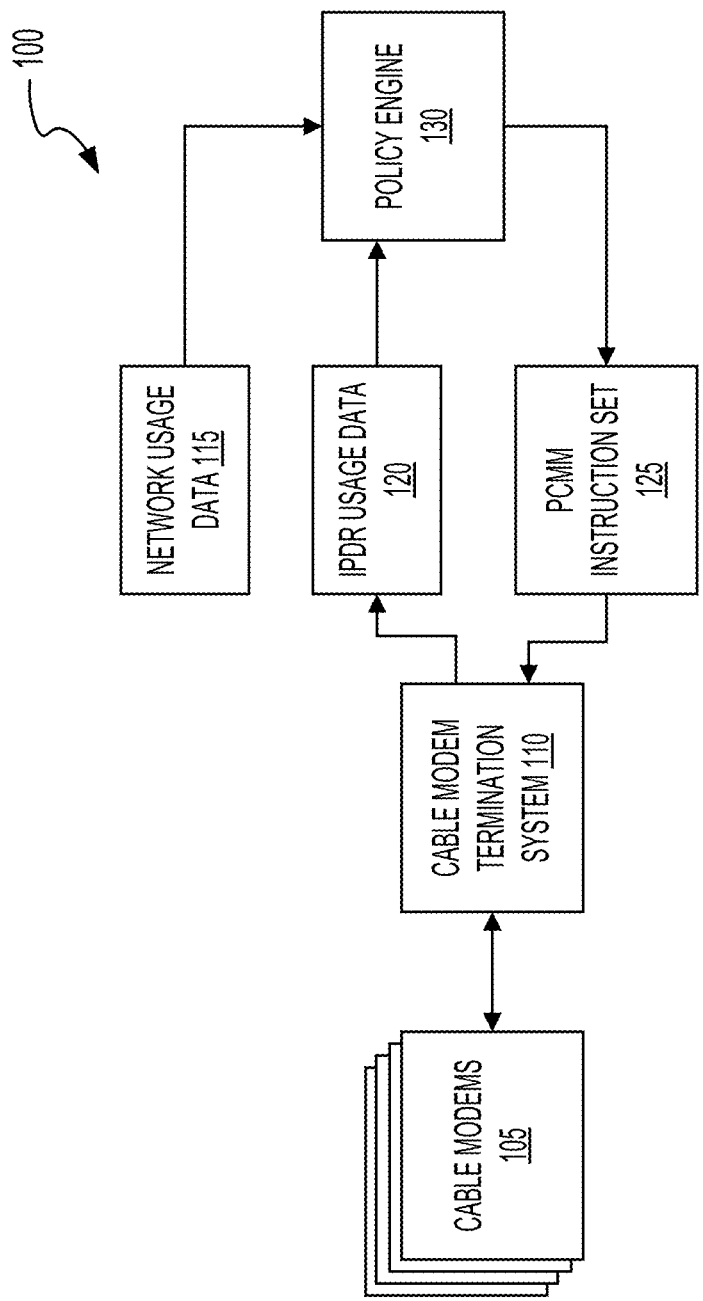
FIG. 1 is a block diagram depicting an implementation of an environment for managing cable modems connected to a cable modem termination system.

FIG. 1 is a block diagram depicting one implementation of an environment 100 for managing cable modems connected to a cable modem termination system (CMTS) for Internet access. The environment 100 includes at least one plurality of cable modems 105. The environment 100 can include at least one cable modem termination system (CMTS) 110. The environment 100 also can also include at least one Policy Engine 130. The CMTS 110 can provide Internet Protocol Detail Record (IPDR) usage data 120 to the Policy Engine 130. The Policy Engine 130 can provide at one or more PacketCable Multimedia (PCMM) instruction set 125 to the CMTS 110.

Figure 6:
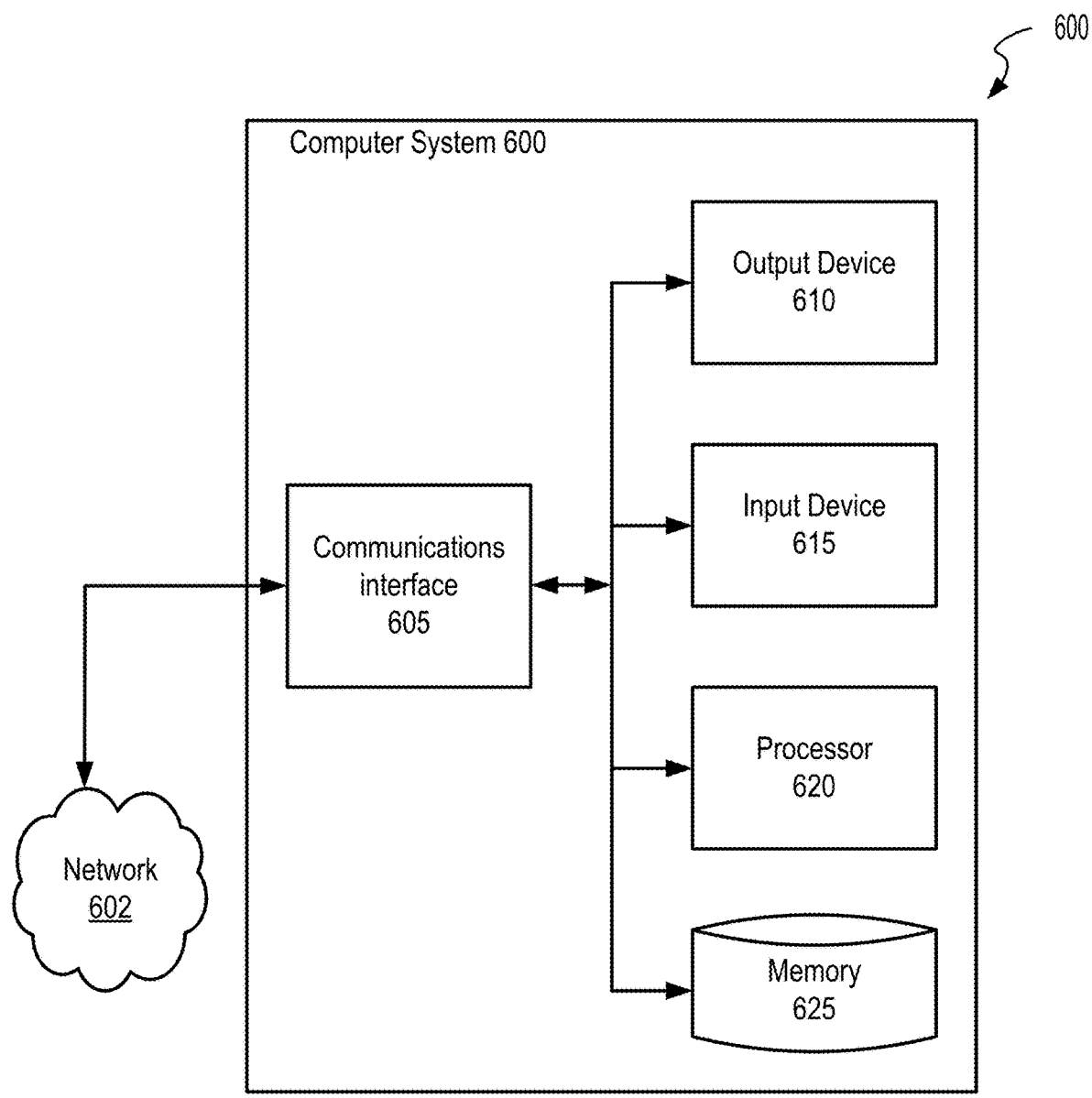
FIG. 6 shows the general architecture of an illustrative computer system that may be employed to implement any of the computer systems discussed herein.

Each of the cable modems 105 can include some or all of the elements of computer system 600 illustrated in FIG. 6. The cable modems 105 can include one or more processors 620 and memory 625. The memory 625 can store processor-executable instructions that, when executed on the processor 620, cause the processor 620 to perform some or all of the operations described herein. The cable modems 105 can include one or more communication interfaces 605. In some embodiments, the cable modems 105 include two communication interfaces: one communication interface configured to communicate using a high-speed infrastructure (e.g., coaxial cable infrastructure, hybrid-fiber coaxial cable infrastructure, etc.) and a second communication interface configured to interface with an Ethernet network. The cable modems can act as a network bridge between the high-speed infrastructure connected to the CMTS 110 and the local Ethernet network established by the second communication interface to provide high-speed cable services to one or more subscribers interfacing with the modem. For example, a cable modem can provide services such as high-speed internet and Voice-Over IP (VoIP) to subscriber computing devices by facilitating bi-directional data communication with the CMTS 110 over coaxial cable lines. The cable modems 105 can translate the high-frequency radio signals from the CMTS 110 to conventional electrical Ethernet signals and vice-versa. In some embodiments, the cable modems 105 can also function as an Ethernet router, which can provide internet service to many users by establishing a Local-Area Network (LAN). In such embodiments, the cable modems 105 can use the Dynamic Host Configuration Protocol to provide dynamic IP addresses to the devices connected to the LAN.

The cable modems 105 may use the Data Over Cable Service Interface Specification (DOCSIS) protocol to communicate with the CMTS 110. In such embodiments, the CMTS is the head-end in the DOCSIS architecture, and can control the operations of the plurality of cable modems 105. Each of the cable modems 105 may communicate with the CMTS 110 using a number of channels, including at least one upstream channel and at least one downstream channel. In such embodiments, the one or more upstream channels can be used to carry signals from the respective cable modem 105 to the CMTS 110, and the one or more downstream channels can be used to carry signals from the CMTS 110 to the respective cable modem 105. The DOCSIS protocol can define the physical layer and the Media Access Control (MAC) protocol layer that can be used on these channels.

The Cable Modem Termination System (CMTS) 110 can include some or all of the elements of computer system 600 illustrated in FIG. 6. The CMTS 110 can include one or more processors 620 and memory 625. The memory 625 can store processor-executable instructions that, when executed on the processor 620, cause the processor 620 to perform some or all of the operations described herein. The cable modems 105 can include one or more communication interfaces 605. In some embodiments, the cable modems 105 include two communication interfaces: one communication interface configured to communicate using a high-speed infrastructure (e.g., coaxial cable infrastructure, hybrid-fiber coaxial cable infrastructure, etc.) and a second communication interface configured to interface with a high-capacity Ethernet data link of a cable service provider. The CMTS 110 can be located in the headend of a cable service provider, and can be connected to the internet via very high capacity Ethernet data links. The CMTS 110 can service many cable modems, for example four thousand to one-hundred fifty thousand cable modems, depending on the capacity of the CMTS 110. A CMTS 110 with a high traffic capacity can service more modems. The CMTS 110 can communicate with many cable modems via radio frequency infrastructures (e.g., coaxial cable infrastructure, hybrid-fiber coaxial cable infrastructures, etc.). The CMTS 110 can provide internet data to each cable modem 105 by encapsulating each of the IP packets according to the DOCSIS standard and sending them to a respective downstream channel.

The CMTS 110 can include a plurality of coaxial interfaces, each of the coaxial interfaces connected to a respective one of the cable modems 105. The CMTS 110 can also include one or more Ethernet interfaces, allowing the CMTS 110 to connect to a network (e.g. the internet or phone). The CMTS 110 can communicate with one or more cable modems 105 using the DOCSIS protocol as described above to provide cable subscription services (e.g. internet or phone, etc.). In addition, the CMTS 110 can provide IPDR usage data 120 to the Policy Engine 130, including details about performance and usage of IP-based services of each of the modems 105. The CMTS 110 can also monitor the network activity of each of the modems 105 using SNMP data. Using the DOCSIS protocol, the CMTS 110 can establish and manage service flows on upstream and downstream channels for each modem 105. Service flows are unidirectional flows of packets that provide a particular type of service (e.g., interne access). The behavior of each of the service flows is governed by the CMTS 110, which can receive PCMM instructions 125 to change how the modems 105 can access subscription services.

Figure 2:
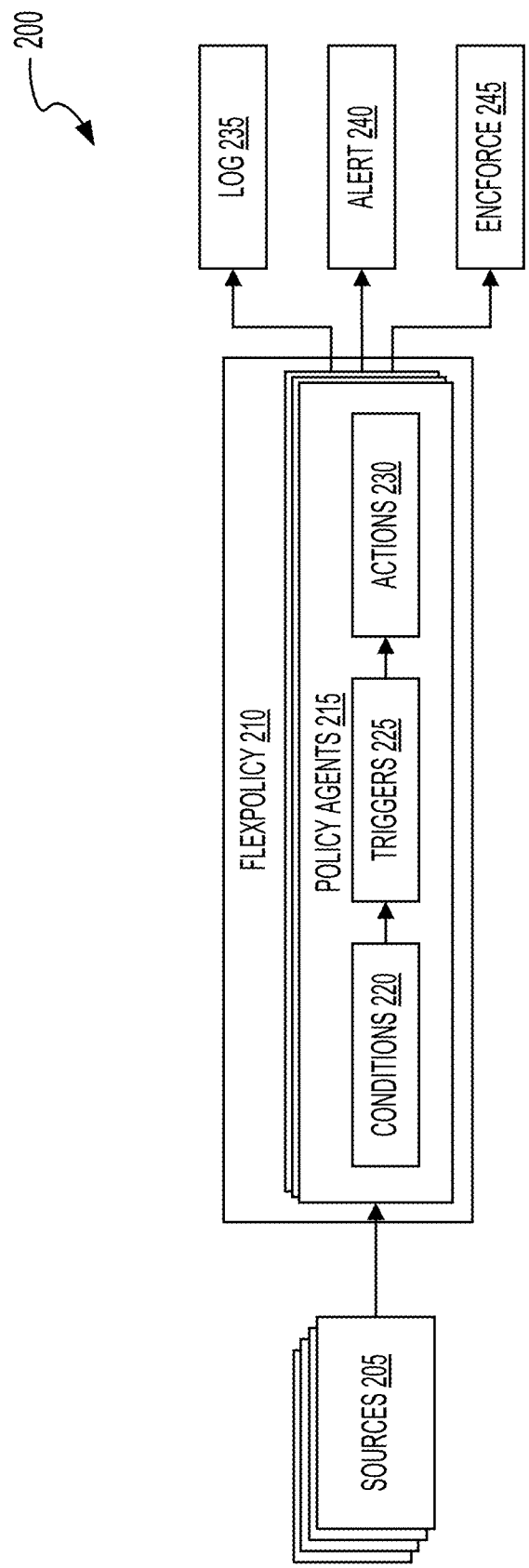
FIG. 2 shows a block diagram depicting an example implementation of a FlexPolicy containing a plurality of policy agents.

The Policy Engine 130 can be processor-executable instructions that are executed by a computer processing system, for example a server. The Policy Engine 130 instructions can utilize the interfaces present on the server to perform one or more of the operations described herein. The Policy Engine 130 can be configured to interface or communicate with multiple heterogeneous data sources to get network information such as IPDR data 120, SNMP data (network usage data 115), CRM data, and billing information. The Policy Engine 130 can access the network to monitor the usage data resulting from the cable modems 105 that interface with the CMTS 110. In some embodiments, the Policy Engine 130 can provide, execute, or otherwise operate a FlexPolicy 210, as shown in FIG. 2. In an example embodiment, operating a FlexPolicy 210 can include continuously collecting and monitoring IPDR usage 120 and Simple Network Manager Protocol (SNMP) network utilization data 115 from the CMTS 110 in the network to detect conditions of congestion on any channel and identify the modems 105 contributing to the usage of those channels. If a specific congestion level condition is reached, the Policy Engine 130 can automatically trigger an action to send a PCMM instruction set 125 to the CMTS 110 that then begins to regulate the bandwidth of specific modems in the plurality of modems 105 in accordance with the PCMM instruction set.

In some embodiments, the Policy Engine 130 can leverage PCMM functionality in a highly targeted manner that can enable operators to enforce very specific policies such as managing peak congestion periods for network bandwidth management purposes. The Policy Engine 130 can generate PCMM instructions 125 that are executable by the CMTS 110 that can enforce management policies to modify network behavior. For example, the Policy Engine 130 may determine that certain modems of the plurality of modems 105 are congesting channels through excessive use and affecting the bandwidth of other modems during certain periods. The Policy Engine 130 can generate PCMM instructions 125 that impose bandwidth limitations on the modems 105 that are contributing most to the network congestion through excessive use and provide them to the CMTS 110. The CMTS 110 can execute the PCMM instructions 125 to enforce management policies that regulate the modems 105. In this example, the Policy Engine 130 can ease network congestion and extend the life of network nodes with high utilization by precisely targeting specific high usage modems with policy enforcement. This can ensure that the policy impacts as few modems as possible on congested nodes during times of peak utilization. This can improve the quality of experience for the vast majority of subscribers on congested nodes.

In another example embodiment, the Policy Engine 130 can be deployed for bandwidth management. This embodiment could be very relevant for operators of broadband networks because of the limited resources/bandwidth available to deliver broadband services. Operators can have the ability to continuously manage network congestion and enforce bandwidth policies, whether the objective is to enforce acceptable usage policies or manage bandwidth during peak usage periods. In some embodiments, the Policy Engine 130 can provide an automated method of managing bandwidth at the subscriber (e.g., modem) level without additional hardware required in the operator's network. Non-limiting example data illustrating the results of such an embodiment are included in FIG. 5.

In another example embodiment, the Policy Engine 130 can combine Customer Relationship Management (CRM) data and billing data with IPDR usage and SNMP network utilization to micro-target policy enforcement on the top subscribers of the congested segments of the network in real-time. This can provide the operator with the ability to impact the least number of subscribers to have the most impact on congestion while continuing to provide full provisioned speeds to all customers on non-congested areas of the network.

The IPDR usage data 120 can include usage and performance data for IP-based services. IPDR usage data 120 can include usage and activity information about individual cable subscribers. For example, IPDR service counters can track the number of packets and octets in an individual service flow. IPDR data can also include identifying information about each modem 105, such as MAC address and IP address. IPDR data can also include information about a service flow, for example service uptime, number of dropped packets, number of delayed packets, and start/end of service time. IPDR data can also include information about a subscriber and subscriber's corresponding service flow(s), including the name of the CMTS serving the subscriber, the IP address of the CMTS, the total system uptime of the CMTS serving the subscriber, the interface name of a CATV interface of the subscriber, the index of a CATV interface of the subscriber, the upstream interface name of the subscriber, the upstream interface index of the subscriber, the downstream interface name of the subscriber, the MAC address of the cable modem of the subscriber, the registration mode of the modem of the subscriber, the IP address of the cable modem of the subscriber, a list of IP addresses assigned to CPE's behind the cable modem of the subscriber, an indication that the service flow is running for the subscriber, the time of IPDR record creation, the service class name applied to the service flow of a subscriber, the service direction (e.g., upstream or downstream), the current or final count of octets passed by the service flow of the subscriber, the current or final count of packets passed by the service flow of the subscriber, the number of packets dropped by the CMTS while enforcing a Quality-of-Service (QoS) Service Level Agreement (SLA), the number of packets delayed by the CMTS while enforcing a QoS SLA, the CMTS uptime when the service flow was created, and the duration of the service of the subscriber in seconds.

The Policy Engine 130 can provide PCMM instructions 125 to the CMTS 110 for the management of individual modems or subscribers. For example, the Policy Engine 130 may generate and provide instructions using the PCMM protocol to limit the bandwidth of the subscribers using the most (e.g., a predetermined number of modems using the most bandwidth when sorted by usage data, etc.) bandwidth on a congested channel. Compared to other approaches, which may use a blanket bandwidth limitation across all users on a congested channel, the present solution allows for a more fair allocation of bandwidth to all subscribers. In this example, this means limiting the bandwidth of those subscribers that are contributing most to the network congestion. The PCMM instructions 125 can include information about individual subscribers or modems, including MAC addresses, IP address, reserved bit rates, bandwidth limitations, and service metadata. The PCMM instructions 125 can configure the CMTS 110 to change the service parameters for individual subscribers (e.g., modems) that are serviced by the CMTS 110. The PCMM instructions 125 can also support call tracing and other voice related information. The PCMM instructions 125 may also include information about cable modem registration, gateway controllers and other gate information, record keeping servers, and video telephony. In some embodiments, the PCMM instructions can support both unicast and multicast operations, counter information and control, global information requests, and other requests for data to be sent to the Policy Engine 130.

FIG. 2 is a block diagram depicting an implementation of an environment 200 for operating a FlexPolicy 210. The FlexPolicy 210 can employ independent, autonomous policy agents 215 that monitor sources 205 in for one or more conditions or events that can trigger the execution of one or more policy enforcement actions based on predefined rules. In some embodiments, the FlexPolicy 210 can employ policy agents 215 that operate continuously or in real-time. The functional elements of each policy agent 215 are policy conditions 220, policy triggers 225, and policy actions 230. A policy action 230 can execute one or more of the following actions: create a log entry 235, generate an alert 240, or perform an enforcement action 245. The FlexPolicy 210 can include or execute any type and form of executable instructions, such as an application, program, service, task, process, library or script to perform any of the configured functionality or operations.

The policy agents 215, the policy conditions 220, the policy triggers 225, and the policy actions 230 can include or execute at least one computer program or at least one script. The policy agents 215, the policy conditions 220, the policy triggers 225, and the policy actions 230 can be separate components, a single component, or part of the FlexPolicy 210. A policy condition 220 can be an element within a source 205, service, file, or feed that is selected for monitoring by a respective policy agent 215. For example, a policy agent 215 could monitor subscriber usage parameters on IPDR records exported by a CMTS. In another example, the policy agent 215 could monitor network channel utilization values received via SNMP elements.

The policy triggers 225 can be a criteria, for example a specific threshold, that is being evaluated on one or more selected policy conditions 220 to determine if a specific action should be triggered. For example, by combining CRM and billing data with IPDR usage and SNMP utilization statistics, the FlexPolicy 210 can micro-target enforcement actions in real-time to the top usage subscribers with specific service packages, being serviced on congested areas of the network. The policy actions 230 can execute at least the following actions: create a log entry 235, generate an alert 240, or perform an enforcement action 245. Creating a log item 235 can include the detected policy condition 220, along with an associated trigger and detection timestamp. This could be used to simulate the impacts of policy rules if they were enabled by logging and reporting without any actual service impacting enforcement action. This could be useful, for example, while doing analysis to determine necessary thresholds to achieve desired results.

Generating an alert 240 can include generating a notification. For example, the notification could be an email, SMS message, or smart phone push notification. The notification can include the detected condition along with the associated trigger and detection timestamp. Performing an enforcement action 245 can include executing a specific enforcement action on one or more targets based on the rule associated with the detected policy condition 220 and policy trigger 225. Enforcement of policy actions 245 can be performed by generating or providing PCMM instructions to a CMTS. The PCMM instructions can configure the CMTS to change the service parameters for individual subscribers (e.g., modems) that are serviced by the CMTS. The PCMM instructions can also support call tracing and other voice related information. The PCMM instructions may also include information about cable modem registration, gateway controllers and other gate information, record keeping servers, and video telephony. In some embodiments, the PCMM instructions can support both unicast and multicast operations, counter information and control, global information requests, and other requests. In some embodiments, policy agent 215 actions are automatically terminated when monitored policy conditions 220 do not meet specified policy triggers 225. For example, when usage levels fall below a pre-defined threshold. The FlexPolicy 210 can support multistage policies where a policy agent action 230 can spawn one or more policy agents. The FlexPolicy 210 can support multiple active policy agents 215 operating concurrently. For example, in some implementations each active policy agent 215 is responsible for monitoring a set of conditions associated with a single subscriber. For example, if the FlexPolicy 210 determines that a particular subscriber (e.g., modem) exceeds a particular bandwidth condition on a channel, the FlexPolicy 210 can instantiate additional policy agents 215 to monitor additional conditions of that subscriber. Those additional conditions can be, for example, uplink bandwidth utilization, downlink bandwidth utilization, communication protocol information, or any other network conditions that can be monitored by the FlexPolicy 210.

In some embodiments, a policy agent 215 can support policy conditions 220 and policy triggers 225 including subscriber usage, utilization my MAC domain, and utilization by interface, for example ninety percent. The policy agent 215 can also support policy conditions 220 and policy triggers 225 including a bandwidth limitation, a quota (e.g., a default value or per packet), independent downstream versus upstream policy enforcement, specific location (e.g., by zip code), specific CMTS, and whitelisted or blacklisted MACs. The policy agent 215 can also support policy conditions 220 and policy triggers 225 including select subscribers based on service package to include or exclude from policy enforcement, where a service package is assigned to a modem or subscriber, and the number of subscribers targeted (e.g., top 5). In an example embodiment, FlexPolicy 210 can allow for "whitelisting" of VIP subscribers or premium commercial subscribers to ensure highest value subscribers are not impacted by enforcement. Furthering this embodiment, FlexPolicy 210 can target the low revenue subscribers having the biggest negative impact on the network.

In a non-limiting example embodiment, the FlexPolicy 210 can be configured to utilize thresholds to manage utilization in the MAC domain level. In this example, policy enforcement 245 can be triggered on a specific number of top users. For example, the policy enforcement 245 can be configured to trigger on the top fifty subscribers that exceed the policy thresholds on any given MAC domain. Operationally, the MAC domain policy execution can be similar to a channel exceeded use case.

In another non-limiting example embodiment, the FlexPolicy 210 can be configured to manage policies related to subscriber monthly allowances. In such an embodiment, a usage allowance policy may be implemented to manage users that exceed a specific usage threshold. The policy can trigger enforcement on modems that have exceeded the threshold. For example, if a subscriber reaches their bandwidth allowance, the policy enforcement rules are triggered and the subscriber's bandwidth is throttled to a level defined by the operator. Usage allowances can be easily defined on a per-package plan basis. Balance management can be performed so that any point in the month the subscriber knows exactly what their level of usage is compared to their allowance, which can be presented via a subscriber usage meter. Email notifications can be sent to subscribers at various stage thresholds (e.g., first at 75%, then at 90%, etc.). Such an embodiment can provide flexibility for the operator to require the customer to opt-in to purchases of additional usage, upgrades, or other options. If any of the offers are selected, then the bandwidth enforcement will be released. If the customer elects to continue with the reduced bandwidth for the remainder of the month they may do so, and when the new month starts their bandwidth can be restored to the original bandwidth defined by their package. In another example embodiment, the FlexPolicy 210 can be configured to handle a case where the network capacity has been exceeded. In such a configuration, a network capacity threshold can be set to trigger policy enforcement on a programmable number of top usage subscribers across the entire network.

In another non-limiting example use case, the FlexPolicy 210 can be configured to implement two stage policy enforcement. Such an embodiment could be used to enforce a more aggressive policy on repeat offenders of network thresholds. For example, the FlexPolicy 210 may identify a top user or group of users contributing to network congestion, and may apply policy rules throttling their network bandwidth to mitigate the congestion. If one or more of the same users are still classified as top users (i.e., they are still contributing to network congestion) after the policy is put in place, the FlexPolicy 210 can apply a more aggressive enforcement on that repeat user or group of users.

Figure 3:
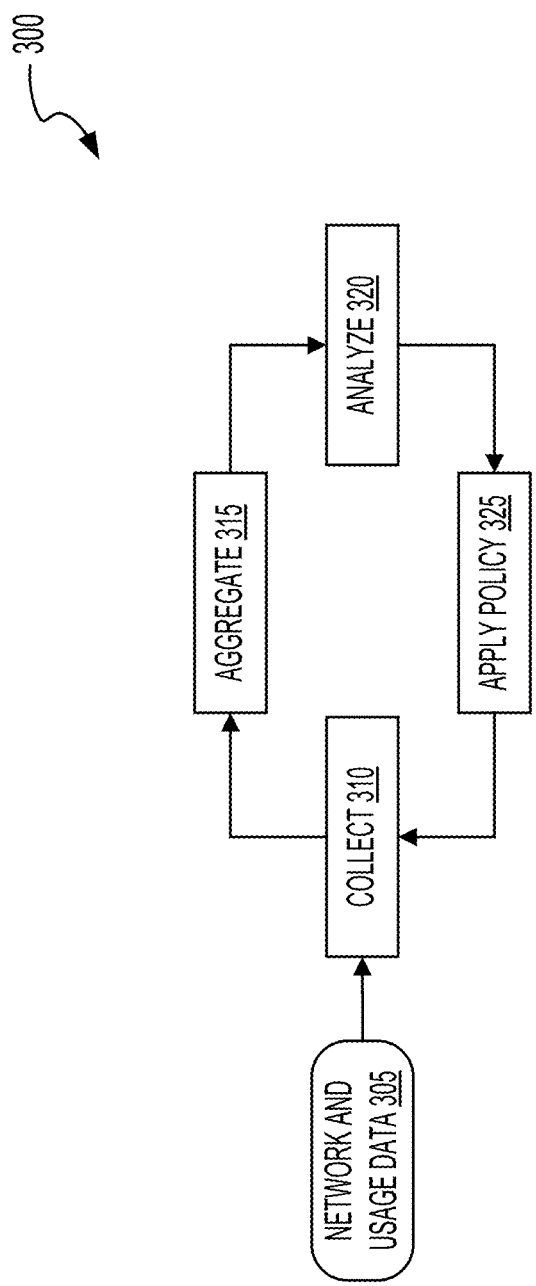
FIG. 3 shows a flow diagram of an example process loop for the continuous management of networking policies.

FIG. 3 shows a flow diagram of an example process 300 for the management of networking policies, such as continuously or in real-time in some embodiments. In particular, the process 300 can be executed by either the Policy Engine 130 or the FlexPolicy 210 as shown in FIGS. 1 and 2 respectively. The process 300 includes collecting network and usage data 310, aggregating the network and usage data 315, analyzing the network and usage data 320, and applying management policies 325.

The process 300 can collect network and usage data 310, for example from a networking interface. Network and usage data 305 can include IPDR data, SNMP data, CRM data, TR-069 Customer Premise Equipment Management Protocol, and billing information. Network and usage data 305 can also include individual subscriber bandwidth usage, individual modem usage, MAC domain usage, network interface usage, subscriber quota information, upstream and downstream data and metadata, location information, CMTS information, whitelist or blacklist information, subscriber data (e.g., demographic information, subscriber package information, biometric information, service information), and the number of subscribers targeted by existing policies. Network and usage data 305 can also include any information needed to enforce at least the policies described herein. The process 300 can collect at least this information from a CMTS or other network infrastructure.

The process 300 can aggregate the network and usage data 315. In some embodiments, aggregating the network and usage data 315 can include processing, filtering, aggregating or combining the data collected in step 310 into collections of data. In some embodiments, these collections of data can be associated with individual subscribers or groups of subscribers. The collections of data can include any of the information needed to enforce at least the policies described herein.

The process 300 can analyze the network and usage data 320. Analyzing the data 315 can include comparing the data collected in 310 and aggregated in 315 to predetermined thresholds. For example, the process 300 may determine that the bandwidth of a particular subscriber has exceeded the bandwidth of the subscriber's service package. In another example, the process 300 may determine a set of subscribers with the highest bandwidth utilization that are contributing to network congestion on a node. In another example, the process 300 can analyze the data to determine utilization of MAC domains. The process 300 can determine whether MAC domains have exceeded a utilization threshold. In another example, the process 300 can analyze the network and usage data or aggregated data to determine whether the utilization of an entire network has crossed a network capacity threshold. In another example, the process 300 can determine that a bandwidth management policy is in place for a particular subscriber or set of subscribers. By analyzing the data 320, the process 300 can determine a set of subscribers that are still contributing to network congestion after the bandwidth management policy has been put in place.

The process 300 can apply one or more management policies 325. Applying the management policies 325 can be based off of the analyzed data in step 320. In some embodiments, applying policies can include generating or providing one or more PCMM instruction sets to a CMTS. The PCMM instructions can configure the CMTS to change the service parameters for individual subscribers (e.g., modems) that are serviced by the CMTS. The PCMM instructions can also support call tracing and other voice related information. The PCMM instructions may also include information about cable modem registration, gateway controllers and other gate information, record keeping servers, and video telephony. In some embodiments, the PCMM instructions can support both unicast and multicast operations, counter information and control, global information requests, and other requests. In such embodiments, providing PCMM instruction sets to the CMTS allows for real-time enforcement of policies without the need for modifying a modem's configuration file, a modem reboot, or the installation of additional hardware in the operator's network. For example, upon determining that a particular subscriber has exceeded their bandwidth limit for their service package, the process can provide PCMM instructions to configure the CMTS to throttle the bandwidth of the subscriber.

Applying one or more management policies 325 can include creating a log entry with the condition detected at step 320. For example, the log entry could include the detected time stamp, along with the associated trigger. Applying one or more management policies 325 can also include generating a notification. For example, the process 300 can generate an email or SMS message including the detected condition, associated trigger and detection timestamp and send it to an appropriate party. Applying one or more management policies 325 can also include executing an enforcement action. For example, the enforcement action could be executed by providing PCMM instructions to a CMTS that is responsible for servicing one or more subscribers. The PCMM instructions can cause the CMTS to change how it provides service to some or all of the subscribers it is connected to. In this way, the process 300 can micro-target enforcement actions in real-time to necessary subscribers.

Figure 4:
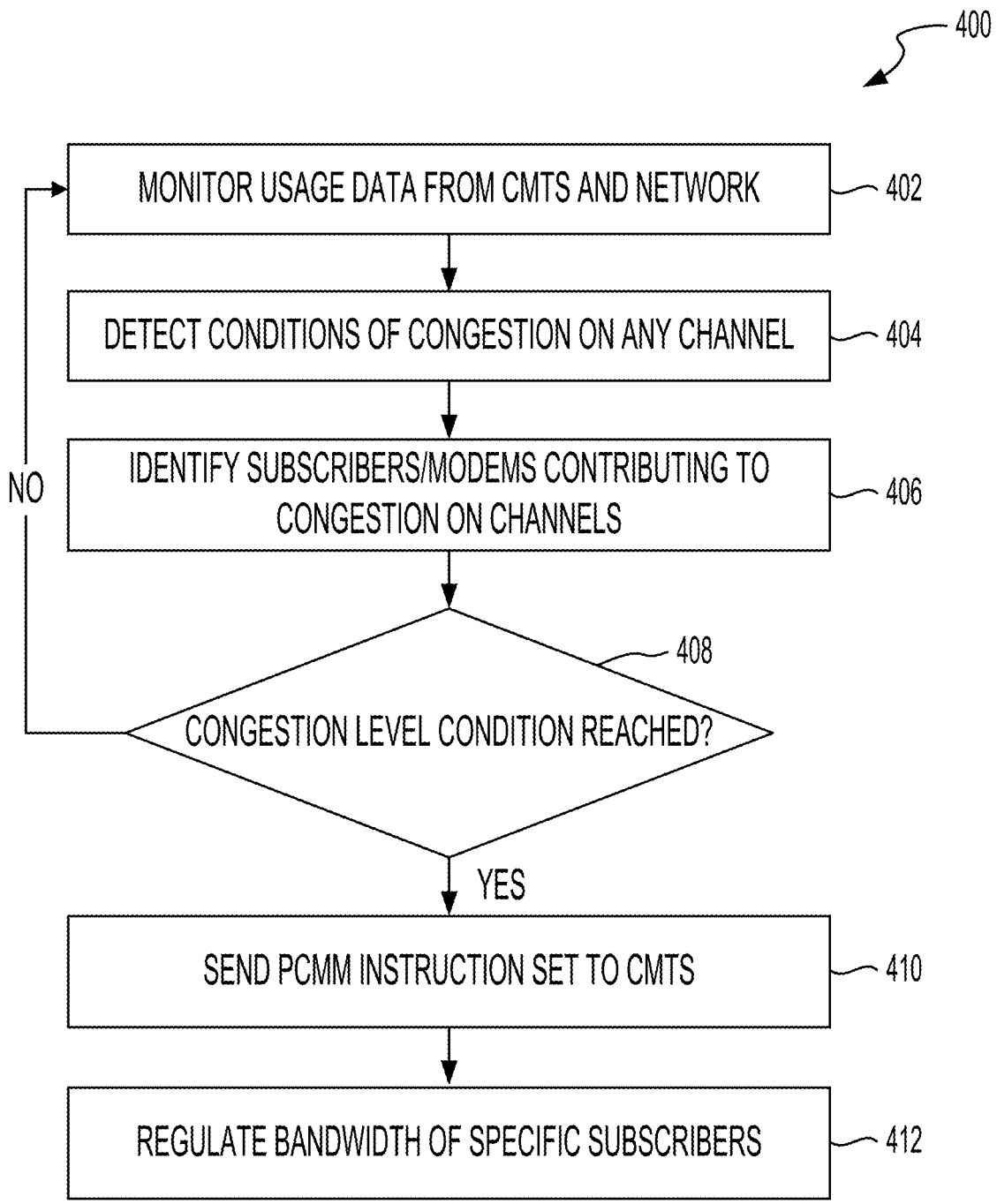
FIG. 4 shows a flow diagram of an example process that can be implemented to regulate the bandwidth of specific subscribers.

FIG. 4 shows a flow diagram of an example process 400 that can regulate the bandwidth of specific subscribers. In particular, the process 400 can be executed by the Policy Engine 130 or the FlexPolicy 210 as shown in FIGS. 1 and 2 respectively. The process 400 includes monitoring usage data from CMTS and the associated network 402, detecting conditions of congestion on any channel 404, identifying subscribers or modems contributing to congestion on identified channels 406, determining whether a congestion level has been reached 408, sending one or more PCMM instruction sets to the CMTS 410, and regulating the bandwidth of specific subscribers 412.

In further detail of step 402, the process 400 can monitor the usage data and information received from a CMTS and its associated network. Monitoring the usage data from the CMTS can include monitoring IPDR data about the subscribers serviced by the CMTS. Monitoring the usage data from the CMTS can also include monitoring network channel utilization values received via SNMP elements. Monitoring the usage data may also include monitoring CRM data or billing data associated with customers or modems that are serviced by the CMTS.

In further detail of step 404, the process 400 can detect conditions of congestion on any channel 404. Congestion on channels may be detected using the data that is monitored in step 402. Congestion can include either upstream congestion or downstream congestion. The process 400 can detect conditions of congestion based off of the IPDR data received from the CMTS. In some implementations, the process 400 can also create a set of channels that it determines to be congested. The set of channels can include information identifying each of the modems that are using the channels. The process 400 can also record a time stamp responsive to the detection of congestion, and associate the time stamp with the congestion event. For example, if a particular channel is determined to be congested at a particular time, the process 400 may record the congestion event along with the time stamp in some form of computer memory (e.g., RAM, hard disk, or database).

In further detail of step 406, the process 400 can identify subscribers or modems contributing to congestion on channels detected in step 404. The process 400 can identify which subscribers (e.g., modems) are contributing most to network congestion by analyzing IPDR data received form the CMTS. The process 400 can also identify which subscribers are contributing most to network congestion by analyzing SNMP network utilization data. For example, CMTS IPDR flows can include counters called IPDR service counters that track the number of packets and octets used by a particular modem. Using IPDR service counters from the modems on a particular channel, and information (e.g., maximum throughput) of the channel, the process 400 can determine which subscribers are contributing most to the usage of the channel. The process 400 can create a set of subscribers or modems that are contributing to the congestion on a channel at a particular time.

In further detail of step 408, the process 400 can determine whether a congestion level condition has been reached. For example, upon detecting conditions of congestion on one or more channels in step 404, the process 400 can compare the overall congestion of a channel to a pre-defined threshold value. If the pre-defined threshold value for congestion is exceeded, the process 400 moves on to step 410. In another embodiment, upon identifying which subscribers or modems are contributing to congestion in step 406, the process 400 may compare the individual subscriber usage to a pre-defined subscriber usage threshold. If any of the subscriber or modems exceed their respective pre-defined subscriber threshold, the process 400 moves on to step 410. If the process 400 does not detect any particular congestion level condition being reached, it can continue to monitor the usage data from the CMTS and the network until such an event occurs.

Figure 5:
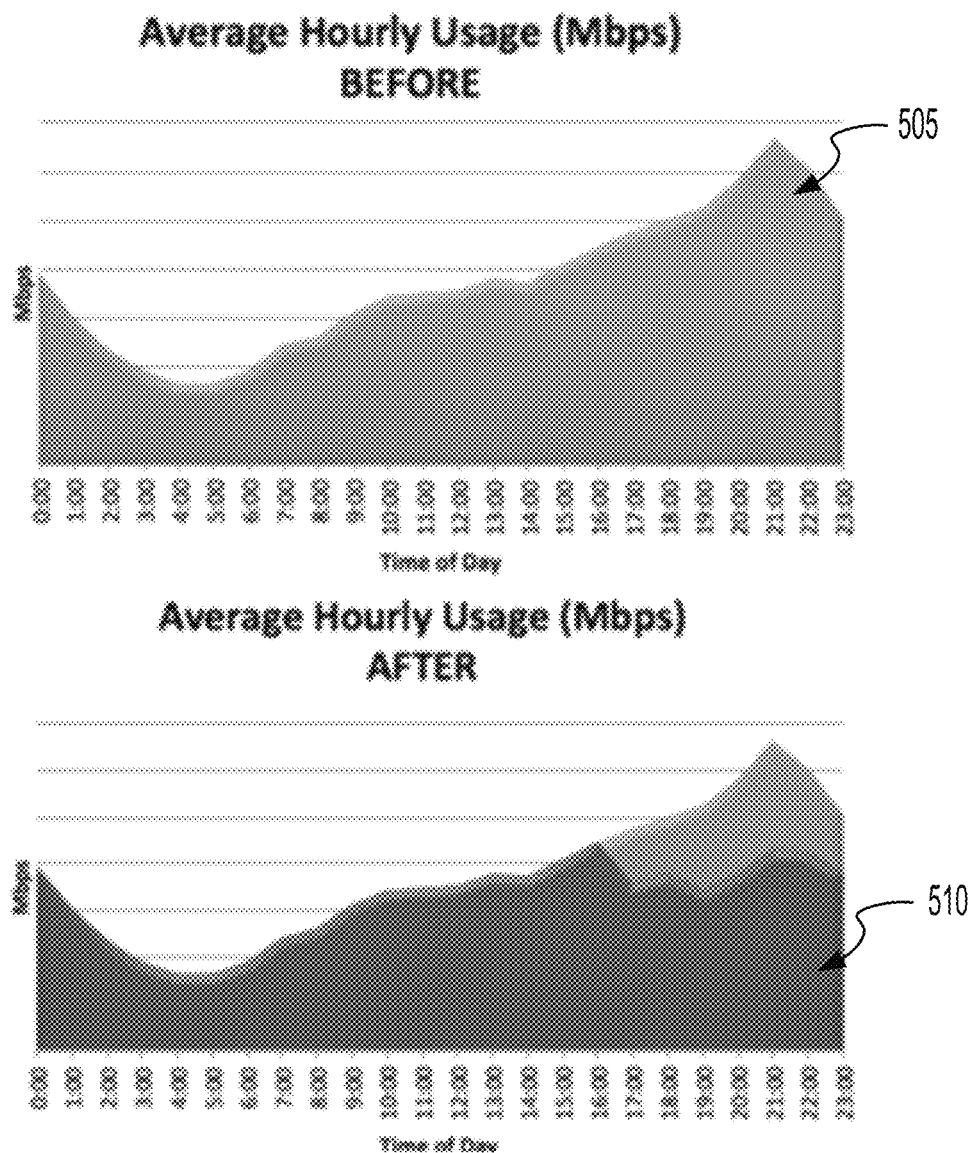
FIG. 5 shows example graph data that compares the hourly network usage at peak hours when applying different management policies.

In further detail of step 410, the process 400 can send one or more PCMM instruction sets to the CMTS. The PCMM instructions can allow for the dynamic creation and deletion of service flows and can be used to effectively change the service of a subscriber by temporarily overwriting the default service configured for a modem associated with the subscriber. The PCMM instructions can configure the CMTS to change the service parameters for individual subscribers (e.g., modems) that are serviced by the CMTS. The PCMM instructions can also support call tracing and other voice related information. The PCMM instructions may also include information about cable modem registration, gateway controllers and other gate information, record keeping servers, and video telephony. In some embodiments, the PCMM instructions can support both unicast and multicast operations, counter information and control, global information requests, and other requests. The PCMM instructions can include information that can limit the bandwidth of certain modems that are serviced by the CMTS. For example, if the process 400 determines that a channel has exceeded a pre-defined channel congestion threshold in step 408, the process 400 can provide PCMM instructions to the CMTS to limit the bandwidth of the set of subscribers that are contributing most to the congestion. In some embodiments, the PCMM instructions can take effect in real-time without requiring a modem reboot or modification to the modem's configuration file. The PCMM instructions can configure the CMTS to change the service parameters for individual subscribers (e.g., modems) that are serviced by the CMTS. In some implementations, the PCMM instructions can also support call tracing and other voice related information. The PCMM instructions may also include information about cable modem registration, gateway controllers and other gate information, record keeping servers, and video telephony. In some embodiments, the PCMM instructions can support both unicast and multicast operations, counter information and control, global information requests, and other requests FIG. 5 shows example graph data that compares the hourly network usage at peak hours when applying different management policies. FIG. 5 illustrates two bandwidth management charts: one without bandwidth management 505, and one with bandwidth management 510. The lightly shaded region 505 represents unmanaged network bandwidth. The darkly shaded region 510 represents network bandwidth that is managed by the Policy Engine 130. As illustrated, the policy enforcement is triggered automatically when the congestion threshold is reached (at around 16:00), and runs continuously until the congestion condition, which was triggered in the original policy, is no longer occurring resulting in lower utilization on the target channel (dark area 510).

FIG. 6 shows the general architecture of an illustrative computer system 600 that may be employed to implement any of the hardware systems, such as cable modems 105, CMTS 110 or servers and computing devices discussed herein in accordance with some implementations. Each of the Policy Engine 130, FlexPolicy 210 or the other components of the FlexPolicy 210 such as the policy agents 215, the conditions 220, the triggers 225, and the actions 230 can be executed on one or more computing devices, for example the computer system 600. The computer system 600 of FIG. 6 comprises one or more processors 620 communicatively coupled to memory 625, one or more communications interfaces 605, and one or more output devices 610 (e.g., one or more display units) and one or more input devices 615.

In the computer system 600 of FIG. 6, the memory 625 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring to the FlexPolicy system 210 of FIG. 2, the FlexPolicy system 210 can include the memory 625 to store information related to conditions 220, triggers 225, and actions 230, among others. The processor(s) 620 shown in FIG. 6 may be used to execute instructions stored in the memory 625 and, in so doing, also may read from or write to the memory various information processed and or generated pursuant to execution of the instructions.

The processor 620 of the computer system 600 shown in FIG. 6 also may be communicatively coupled to or control the communications interface(s) 605 to transmit or receive various information pursuant to execution of instructions. For example, the communications interface(s) 605 may be coupled to a wired or wireless network, bus, or other communication means and may therefore allow the computer system 600 to transmit information to or receive information from other devices (e.g., other computer systems). While not shown explicitly in the system of FIG. 6, one or more communications interfaces can facilitate information flow between the components of the system 600. In some implementations, the communications interface(s) may be configured (e.g., via various hardware components or software components) to provide a website as an access portal to at least some aspects of the computer system 600. Examples of communications interfaces 605 include user interfaces (e.g., web pages), through which the user can communicate with the data processing system 600.

The output devices 610 of the computer system 600 shown in FIG. 6 may be provided, for example, to allow various information to be viewed or otherwise perceived in connection with execution of the instructions. The input device(s) 615 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Figure 7:
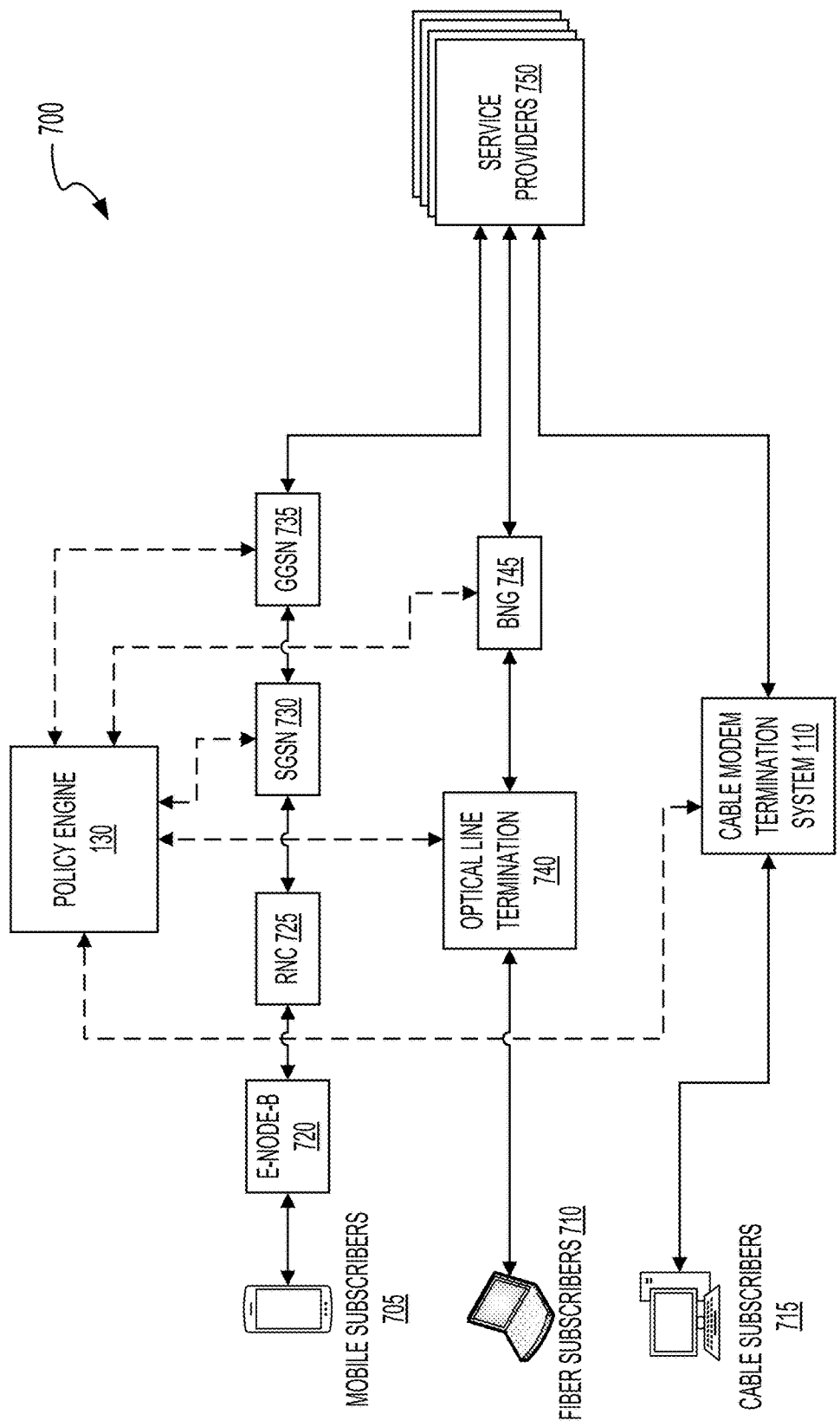
FIG. 7 is a block diagram depicting an implementation of an environment for managing many different types of broadband systems.

FIG. 7 is a block diagram depicting an implementation of an environment for managing many different types of broadband systems. The environment 700 can include mobile subscribers 705, fiber optic broadband subscribers 710, and cable subscribers 715. The environment 700 can include one or more service providers 750. The environment 700 can also include at least one Policy Engine 130. The environment can include at least one CMTS 110 to service cable subscribers 715. The environment 700 can include at least one Optical Line Termination system 740 and a Broadband Network Gateway (BNG) 745 to provide service to fiber subscribers 710. The environment 700 can include a General Packet Radio Service (GPRS) core network to provide service for mobile users, which may include at least one eNodeB 720, a Radio Network Controller (RNC) 725, a Serving GPRS Support Node (SGSN) 730, and a Gateway GPRS Support Node (GGSN) 735.

The mobile subscribers 705 can be any mobile device that is capable of interfacing with a GPRS system. These devices may include, for example, smart phones, mobile phones, tablet computers, laptop computers, and other computing or communication devices. The mobile subscribers 705 can interface with the GPRS network, which may provide Internet services, by wirelessly communication over bidirectional channels with an eNodeB 720. In some embodiments, many mobile subscribers 720 can communicate with a single eNodeB 720 simultaneously.

The fiber subscribers 710 may communicate with an OLT system 740 to receive Internet and other broadband services. The fiber subscribers 710 may use a fiber-optic infrastructure to communicate with the service providers 750. The fiber-optic infrastructure may include one or more OLT systems 740 and one or more BNG systems 745.

The cable subscribers 715 may communicate with a CMTS 110 to receive Internet and other broadband services. The cable subscribers 715 may use cable modems 105 to communicate with the CMTS 110. The cable subscribers 715 may communicate with the CMTS 110 using the DOCSIS protocol as described in detail above.

The eNodeB 720 is responsible for wirelessly communicating with one or more mobile subscriber devices 705. The eNodeB 720 can include an antenna which may wireless transmit and receive data to and from mobile subscribers 705 to provide broadband services, for example Internet service or telephone service. The eNodeB 720 may interface with an RNC system 725. In some embodiments, the eNodeB 720 may contain its own control logic, and need not interface with an RNC system 725. In such embodiments, the eNodeB 720 may interface directly with the SGSN 730.

The Radio Network Controller (RNC) 725 can control one or more eNodeB 720. The RNC 725 can carry out radio resource management, and may also encrypt data before it is sent out to mobile subscribers 705. The RNC 725 may interface with the SGSN 730 via a packet-switched core network infrastructure.

The Serving GPRS Support Node (SGSN) 730 can provide service to individual mobile station or piece of mobile user equipment (e.g. smartphone, tablet computer, etc.). In some embodiments, providing service to a mobile device includes tracking the location of the user device. The SGSN 730 is responsible for the delivery of packets to and from the mobile devices within its geographical service area. The functionality of the SGSN 730 can include packet routing and transfer, mobility management (e.g., attach/detach, location management, etc.), logical link management, and authentication and charging functions. For example, the SGSN 730 may detunnel packets from the GGSN 735, tunnel packets to the GGSN 735, carry out mobility management ewn a standby mode mobile moves from one routing area to another routing area, provide billing information according to data used, perform mobile equipment identity check procedures, supporting SMS transmission, collect charging records, and communicate with other SGSNs. The SGSN 730 is capable of providing data to the Policy Engine 130 to allow for monitoring of mobile subscribers 705. For example, the SGSN may provide the Policy Engine 130 with bandwidth usage information for each mobile device serviced by the SGSN 730. The SGSN 730 is also capable of receiving instructions from the Policy Engine 130 to manage the bandwidth of individual mobile devices. For example, if the Policy Engine 130 determines that a particular SGSN 730 is congested due to a few excessive users, the Policy Engine can provide instructions to the SGSN 730 to limit the bandwidth of those offending users.

The Gateway GPRS Support Node (GGSN) 735 can be a main component of the GPRS core network. The GGSN 735 is responsible for bridging the GPRS network with external packet-switched networks, for example the Internet. The GGSN 735 can determine if a mobile user 705 is active on the GPRS network. The GGSN 735 can forward data destined for a mobile user 705 from an external packet-switched network to the SGSN 730 that services the mobile user 705. The GGSN 735 may discard data if the desired mobile user 705 is inactive. The GGSN 735 is also responsible for routing packets received from the mobile users 705 from the SGSN 730 to the external packet-switched network. In this way, the GGSN 735 can act as a router to many mobile users 705, and behave as a bridge between the GPRS and service provider 750 networks. The GGSN 735 can tunnel the data packets received from the external packet-switched network to the appropriate SGSN 730, and also convert data packets received from the SGSN 730 to the appropriate packet protocol of the external switched network with which the GGSN 735 interfaces. The GGSN 735 can also perform subscriber screening, implement quality-of-service enforcement policies, and packet-data-protocol (PDP) context enforcement. The GGSN 735 can interface with the Policy Engine 130, and provide the Policy Engine 130 with information about the mobile subscribers 705 using the network and different parameters of the service provider network. The GGSN 735 can also receive enforcement policies from the Policy Engine 130. In some embodiments, these network management policies can be implemented and changed in real-time.

The Optical Line Termination system (OLT) 740 can provide broadband service to one or more fiber-optic subscribers 710. Analogous to the CMTS 110 for cable subscribers, the OLT 740 acts as a network bridge between the Ethernet network of the service providers 750 and the fiber-optic infrastructure of the fiber subscribers 710. The OLT 740 is responsible for converting downstream frames destined for fiber subscribers 710 into serial signals that can be transported over a fiber-optic infrastructure. The OLT 740 is also responsible for converting the upstream serial signals received from the fiber subscribers 710 into data frames compatible with the service provider 750 networks. The OLT can also provide control signs for implementing a Media Access Control protocol for the fiber subscribers 710. The OLT can also provide control over the downstream frame processing and the upstream frame processing to implement network management policies.

The Broadband Network Gateway (BNG) 745 can act as a remote access server that routes traffic to and from one or more OLTs 740 and the service provider networks 750. For example, the broadband network gateway can route traffic between an Internet Service Provider (ISP) and an OLT 740 to provide the fiber subscribers 710 with broadband Internet service. The BNG 745 can deliver customized subscriber services, including managing subscribers, including session and circuit management, delivering IP services to subscribers, establishing and managing subscriber sessions, managing subscriber addressing, performing policy and traffic management functions, and aggregating traffic from various subscriber sessions from an access network and routing it to the service provider 750 network. The BNG 745 is capable of providing the Policy Engine 130 with information about fiber subscribers 710 and information about one or more OLTs 740. The BNG 745 can also receive and implement subscriber management policies from the Policy Engine 130. For example, the BNG 745 may provide information to the Policy Engine 130 that indicates the network of a OLT 740 is congested. The BNG 745 may also individual usage information for each fiber subscriber using the OLT 740. In this example, to mitigate the congestion, the Policy Engine 130 may provide the BNG 745 with instructions to limit the bandwidth of the subscribers 710 of the OLT 740 that are contributing most to the network congestion. In some embodiments, the management policies provided to the BNG 745 can be implemented and changed in real-time.

The environment 700 demonstrates that the Policy Engine 130 can implement a FlexPolicy 210 that can leverage many available interfaces and data sources. For example, the Policy Engine 130 implemented in environment 700 can interface with a mobile device network, a fiber optic network, and a cable network. In addition, the Policy Engine 130 can use the TR-069 interface protocol to gain visibility into network environments beyond subscriber end-points, for example the devices connected via WiFi in the home of the subscriber. The Policy Engine 130 can also use the TR-069 to manage the home network environments of subscribers.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as the computer system 600 can include clients and servers. For example, the computer system 600 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to controlling the display of content of information resources, the systems and methods described herein can include applied to other environments. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method of allocating signal processing resources for cable modem endpoints, comprising:
    monitoring, by a policy engine comprising one or more processors and a memory, usage data of a plurality of cable modems that access a channel of a cable network via a cable modem termination system;
    detecting, by the policy engine, from the usage data, a congestion condition on the channel of the cable network;
    identifying, by the policy engine, a first cable modem and a second cable modem of the plurality of cable modems of the cable network that contribute to the congestion condition to a greater degree than other modems of the plurality of cable modems based on a bandwidth allocation of a respective service package of each of the first cable modem and the second cable modem, the respective service package used to access the cable modem termination system, wherein each cable modem of the plurality of cable modems indicates bandwidth of the cable modem can be reduced in accordance with a network policy;
    excluding, by the policy engine, the first cable modem from bandwidth reduction based on the respective service package of the first cable modem;
    determining, by the policy engine, that the congestion condition satisfies a congestion threshold of the network policy;
    sending, by the policy engine, instructions to the cable modem termination system that reduce the bandwidth of the second cable modem and not the first cable modem;
    responsive to sending the instructions to the cable modem termination system, determining, by the policy engine, that the second cable modem remains contributing to the congestion condition to a greater degree than the other modems of the plurality of cable modems;
    sending, by the policy engine, additional instructions to the cable modem termination system that further reduce the bandwidth of the second cable modem; and
    automatically generating, by the policy engine, instructions for the cable modem termination system to stop reducing the bandwidth of the second cable modem upon detecting that usage of the channel of the cable modem termination system has fallen below a predetermined threshold.

2. The method of claim 1, wherein monitoring the usage data from the cable network comprises receiving, by the policy engine, the usage data from internet protocol detail records exported by the cable modem termination system.

3. The method of claim 1, wherein detecting the congestion condition comprises determining, by the policy engine, bandwidth utilization of media access control (MAC) addresses associated with the plurality of cable modems connected to the cable network.

4. The method of claim 1, wherein detecting the congestion condition comprises determining that the cable network has exceeded a network capacity threshold.

5. The method of claim 1, wherein identifying the first and second cable modems comprises:
    determining, by the policy engine, bandwidth utilization information of the plurality of cable modems of the cable network; and
    identifying, by the policy engine, from the bandwidth utilization information, a subset of the plurality of cable modems that contribute most to bandwidth utilization in the cable network, the subset comprising the first and second cable modems.

6. The method of claim 1, wherein determining that the congestion condition satisfies the congestion threshold comprises determining, by the policy engine, that a utilization of the channel of the cable network exceeds a threshold.

7. The method of claim 1, wherein determining that the congestion condition satisfies the congestion threshold comprises determining, by the policy engine, that one or more MAC domains have exceeded a utilization threshold.

8. The method of claim 1, wherein identifying the first and second cable modems of the cable network comprises:
    determining, by the policy engine, that a bandwidth management policy is in place for a set of cable modems of the cable network, the set of cable modems included in the plurality of cable modems; and
    identifying, by the policy engine, from the plurality of cable modems, the first and second cable modems of the cable network other than the set of cable modems that are contributing to the congestion condition.

9. The method of claim 1, wherein sending the instructions to the cable modem termination system comprises:
    generating, by the policy engine, PacketCable Multimedia instructions for the cable modem termination system that change service parameters for the second cable modem; and
    providing, by the policy engine, the PacketCable Multimedia instructions to the cable modem termination system.

10. The method of claim 9, wherein the PacketCable Multimedia instructions are configured to cause the cable modem termination system to throttle the bandwidth of the second cable modem.

11. A system for allocating signal processing resources for cable modem endpoints, comprising:

a policy engine having one or more processors coupled to memory, configured to:

monitor usage data of a plurality of cable modems that access a channel of a cable network via a cable modem termination system;

detect a congestion condition on the channel of the cable network;

responsive to detecting the congestion condition on the channel of the cable network, identify a first cable modem and a second cable modem of the plurality of cable modems of the cable network that contribute to the congestion condition to a greater degree than other cable modems of the plurality of cable modems based on a bandwidth allocation of a respective service package of each of the first cable modem and the second cable modem, the respective service package used to access the cable modem termination system, wherein each cable modem of the plurality of cable modems indicates bandwidth of the cable modem can be reduced in accordance with a network policy;

exclude the first cable modem from bandwidth reduction based on the respective service package of the first cable modem;

determine that the congestion condition satisfies a congestion threshold of the network policy;

send instructions to the cable modem termination system that reduce the bandwidth of the second cable modem and not the first cable modem;

responsive to sending the instructions to the cable modem termination system, determine that the second cable modem remains contributing to the congestion condition to a greater degree than the other modems of the plurality of cable modems;

send additional instructions to the cable modem termination system that further reduce the bandwidth of the second cable modem; and automatically generate instructions for the cable modem termination system to stop reducing the bandwidth of the second cable modem upon detecting that usage of the channel of the cable modem termination system has fallen below a predetermined threshold.

12. The system of claim 11, wherein the policy engine is further configured to receive the usage data from internet protocol detail records exported by the cable modem termination system.

13. The system of claim 11, wherein the policy engine is further configured to determine bandwidth utilization of media access control (MAC) addresses associated with the plurality of cable modems connected to the cable network.

14. The system of claim 11, wherein the policy engine is further configured to determine that the cable network has exceeded a network capacity threshold.

15. The system of claim 11, wherein the policy engine is further configured to:

determine bandwidth utilization information for the plurality of cable modems of the cable network; and identify, from the bandwidth utilization information, a subset of the plurality of cable modems that contribute most to bandwidth utilization in the cable network, the subset comprising the first and second cable modems.

16. The system of claim 11, wherein the policy engine is further configured to determine that a utilization of the channel of the cable network exceeds a threshold.

17. The system of claim 11, wherein the policy engine is further configured to determine that one or more MAC domains have exceeded a utilization threshold.

18. The system of claim 11, wherein the policy engine is further configured to:

determine that a bandwidth management policy is in place for a set of cable modems of the cable network, the set of cable modems included in the plurality of cable modems; and identify, from the plurality of cable modems, the first and second cable modems of the cable network other than the set of cable modems that are contributing to the congestion condition.

19. The system of claim 11, wherein the policy engine is further configured to:

generate PacketCable Multimedia instructions for the cable modem termination system that change service parameters for the second cable modem; and provide the PacketCable Multimedia instructions to the cable modem termination system.

20. The system of claim 19, wherein the PacketCable Multimedia instructions are configured to cause the cable modem termination system to throttle the bandwidth of the second cable modem.

* * * * *